US010808623B2

(12) United States Patent
Staufer (10) Patent No.: US 10,808,623 B2
(45) Date of Patent: Oct. 20, 2020

(54) COMBUSTION CHAMBER ASSEMBLY WITH BURNER SEAL AND NOZZLE AS WELL AS GUIDING FLOW GENERATING EQUIPMENT

(71) Applicant: Rolls-Royce Deutschland Ltd & Co KG, Blankenfelde-Mahlow (DE)

(72) Inventor: Max Staufer, Berlin (DE)

(73) Assignee: ROLLS-ROYCE DEUTSCHLAND LTD & CO KG, Blakenfelde-Mahlow (DE)

( * ) Notice: Subject to any disclaimer, the term of this patent is extended or adjusted under 35 U.S.C. 154(b) by 9 days.

(21) Appl. No.: 16/352,256

(22) Filed: Mar. 13, 2019

(65) Prior Publication Data

US 2019/0285003 A1 Sep. 19, 2019

(30) Foreign Application Priority Data

Mar. 15, 2018 (DE) .......................... 10 2018 106 051

(51) Int. Cl.
*F23R 3/28* (2006.01)
*F02C 7/28* (2006.01)
*F02C 9/26* (2006.01)

(52) U.S. Cl.
CPC ................ *F02C 7/28* (2013.01); *F02C 9/263* (2013.01); *F23R 3/283* (2013.01); *F23R 3/286* (2013.01); *F23R 2900/00012* (2013.01)

(58) Field of Classification Search
None
See application file for complete search history.

(56) References Cited

U.S. PATENT DOCUMENTS 4,934,145 A 6/1990 Zeisser
5,117,637 A * 6/1992 Howell .................. F23R 3/283
60/740

(Continued)

FOREIGN PATENT DOCUMENTS

DE 19508111 A1 9/1996
DE 102016212649 A1 1/2018

OTHER PUBLICATIONS

German Search Report dated Nov. 2, 2018 for counterpart German Patent Application No. 10 2018 106 051.3.

(Continued)

*Primary Examiner* — Michael Lebentritt
(74) *Attorney, Agent, or Firm* — Shuttleworth & Ingersoll, PLC; Timothy J. Klima (57) ABSTRACT

A combustion chamber assembly, with a combustion chamber nozzle for providing a fuel-air mixture at a nozzle exit opening. A nozzle main body includes an inner air guiding channel for conveying air to the exit opening, a fuel guiding channel for conveying fuel to the exit opening that is positioned radially further outwards to the axis than the inner air guiding channel, and a radially outwardly positioned air guiding element for guiding the air and the fuel-air mixture discharged at the exit opening in a radially outwardly oriented outflow direction. A guide flow generation device creates a guide flow of air that radially borders the air and the fuel-air mixture discharged at the exit opening, and defines a maximum outflow angle for the outflow direction with respect to the nozzle longitudinal axis at which the air and fuel-air mixture discharged at the exit opening can flow radially outwards.

12 Claims, 5 Drawing Sheets

(56) References Cited

U.S. PATENT DOCUMENTS

| | | | | |
|---|---|---|---|---|
| 5,220,786 | A * | 6/1993 | Campbell | F23R 3/14 |
| | | | | 60/39.55 |
| 5,647,538 | A | 7/1997 | Richardson | |
| 5,737,921 | A | 4/1998 | Jones et al. | |
| 5,894,732 | A | 4/1999 | Kwan | |
| 8,365,534 | B2 * | 2/2013 | Popovic | F23R 3/10 |
| | | | | 60/740 |
| 8,413,448 | B2 | 4/2013 | Hicks et al. | |
| 9,068,514 | B2 * | 6/2015 | Milosavljevic | F23D 11/38 |
| 9,423,137 | B2 | 8/2016 | Nickolaus | |
| 2003/0196440 | A1 * | 10/2003 | Steinthorsson | F23D 11/107 |
| | | | | 60/776 |
| 2006/0248898 | A1 | 11/2006 | Buelow et al. | |
| 2008/0280243 | A1 * | 11/2008 | Swanson | F23D 14/36 |
| | | | | 431/254 |
| 2009/0100837 | A1 | 4/2009 | Von Der Bank | |
| 2009/0173076 | A1 | 7/2009 | Toon | |
| 2012/0272661 | A1 * | 11/2012 | Milburn | F23R 3/283 |
| | | | | 60/796 |
| 2013/0036739 | A1 * | 2/2013 | Horikawa | F23R 3/14 |
| | | | | 60/735 |
| 2014/0318148 | A1 * | 10/2014 | Clemen | F23R 3/60 |
| | | | | 60/796 |
| 2015/0159874 | A1 * | 6/2015 | Toon | F23D 11/107 |
| | | | | 60/737 |
| 2017/0176006 | A1 * | 6/2017 | Gerendas | F23R 3/06 |
| 2018/0156450 | A1 * | 6/2018 | Doerr | F02C 7/222 |
| 2019/0093896 | A1 * | 3/2019 | Clemen | F23R 3/14 |
| 2019/0093897 | A1 * | 3/2019 | Staufer | F23R 3/286 |
| 2019/0113226 | A1 * | 4/2019 | Doerr | F23R 3/14 |

OTHER PUBLICATIONS

European Search Report dated Jul. 16, 2019 for counterpart European Patent Application No. EP19162730.6.

* cited by examiner

Fig. 3C
STATE OF THE ART

Fig. 3D

COMBUSTION CHAMBER ASSEMBLY WITH BURNER SEAL AND NOZZLE AS WELL AS GUIDING FLOW GENERATING EQUIPMENT

REFERENCE TO ASSOCIATED PATENT APPLICATION

This patent application claims priority over the German patent application No. 10 2018 106 051.3 filed on 15 Mar. 2018, which is included herein in its entirety by reference.

BACKGROUND

The proposed solution relates to a combustion chamber assembly group with a burner seal and a nozzle for a combustion chamber of an engine for providing a fuel-air mixture at a nozzle exit opening of the nozzle.

An (injection) nozzle for a combustion chamber of an engine, in particular for an annular chamber of a gas turbine engine, comprises a nozzle main body that has a nozzle exit opening and that, in addition to a fuel guiding channel for conveying fuel to the nozzle exit opening, has multiple (at least two) air guiding channels for conveying air intermixed with fuel to the nozzle exit opening. A nozzle usually also serves for swirling the supplied air, which, intermixed which the supplied fuel, is subsequently conveyed into the combustion chamber at the nozzle exit opening of the nozzle, and is supported inside a passage opening of a burner seal. For example, multiple nozzles may be grouped together in a nozzle assembly group of a combustion chamber assembly group that comprises multiple nozzles arranged next to each other, usually along a circular line, for introducing fuel into the combustion chamber.

In nozzles with multiple air guiding channels and at least one fuel guiding channel as they are known from the state of the art, for example from U.S. Pat. No. 9,423,137 B2 or U.S. Pat. No. 5,737,921 A, it is provided that a first air guiding channel extends along a nozzle longitudinal axis of the nozzle main body and a fuel guiding channel is positioned radially further outwards with respect to the nozzle longitudinal axis than the first air guiding channel. In that case, it is additionally provided that at least one further air guiding channel is positioned radially further outwards with respect to the nozzle longitudinal axis than the fuel guiding channel. Here, one end of the fuel guiding channel at which the fuel from the fuel guiding channel flows out in the direction of the air from the first air guiding channel is typically located—with respect to the nozzle longitudinal axis and in the direction of the nozzle exit opening—in front of the end of the second air guiding channel from which the air then flows out in the direction of a mixture of air from the first air guiding channel and fuel from the fuel guiding channel. What is further known in the state of the art and for example also provided in U.S. Pat. No. 9,423,137 B2 or in U.S. Pat. No. 5,737,921 A is to provide such a nozzle with a third air guiding channel, with its end, which may also be displaced radially outwards, following the end of the second air guiding channel in the axial direction.

What is further known from the state of the art is to provide an air guiding element for guiding air that flows out from the at least one further air guiding channel at an end of a radially outwardly positioned air guiding channel that is located in the area of the nozzle exit opening. By means of such an air guiding element, air flowing out of the further air guiding channel and usually being swirled is deflected radially inwards to achieve intermixing with the fuel from the fuel guiding channel and the additional air, in particular from the first inner air guiding channel. In this way, a spray cloud with a fuel-air mixture is to be created, inside of which the fuel is present in the form of finely dispersed drops.

Further, by means of the air guiding element, the air that is discharged at the nozzle exit opening and the fuel-air mixture that is discharged at the nozzle exit opening is guided in a radially outwardly oriented outflow direction. This outflow direction that is already partially determined by the air guiding element at the nozzle main body is usually (additionally) controlled by a flow guiding element at the burner seal. Such a flow guiding element is formed by an axial projection at the burner seal that, when the combustion chamber assembly group is mounted according to the intended use, projects in the direction of the combustion chamber and typically has a widening end section that is oriented radially outwards. The targeted guidance of the air that is discharged at the nozzle exit opening and in particular of the fuel-air mixture that is discharged at the nozzle exit opening substantially influences the intermixing that occurs in the fuel-air mixture, and thus the emissions that are created during combustion, in particular the generation of soot. During operation of the engine, a flow guiding element of the burner seal is subjected to the high temperatures that are present inside the combustion chamber and therefore often has to be cooled with considerable effort. Despite this, temperature-related damage and signs of wear often occur at the flow guiding element of the burner seal. Thus, the burner seal needs to be regularly replaced.

SUMMARY

Therefore, there is the need for a combustion chamber assembly group that is improved in this regard.

The objective is achieved with a combustion chamber assembly group described herein.

According to a first aspect, what is proposed is a combustion chamber assembly group with a nozzle and a burner seal, in which the nozzle has a nozzle main body that comprises the nozzle exit opening and that extends along a nozzle longitudinal axis and comprises at least the following:

- at least one (first) inner air guiding channel which extends along the nozzle longitudinal axis and serves for conveying air to the nozzle exit opening,
- at least one fuel guiding channel for conveying fuel to the nozzle exit opening, which is positioned radially further outwards with respect to the nozzle longitudinal axis as compared to the inner air guiding channel, and
- at least one air guiding element for guiding air that is discharged at the nozzle exit opening and of the fuel-air mixture that is discharged at the nozzle exit opening in a radially outwardly oriented outflow direction, being positioned radially outwards with respect to the nozzle longitudinal axis with respect to the nozzle longitudinal axis as compared to the inner air guiding channel and the fuel guiding channel.

In addition to the at least one air guiding element, a guide flow generation device is provided, which is configured for creating at least one guide flow that radially borders the air that is discharged at the nozzle exit opening and the fuel-air mixture that is discharged at the nozzle exit opening, and defines and delimits a maximum outflow angle for the outflow direction with respect to the nozzle longitudinal axis at which the air that is discharged at the nozzle exit opening and the fuel-air mixture that is discharged at the nozzle exit opening can flow out radially outwards. The guide flow generation device is at least partially provided at the nozzle and/or at the burner seal.

For creating at least a portion of the guide flow, at least one inflow opening of the guide flow generation device is provided at the burner seal. The burner seal thus integrates an inflow opening that acts as a component of the guide flow generation device. Thus, the inflow opening is not a cooling air opening, for example for guiding cooling air towards a flow guiding element of the burner seal. Instead, here the fluid that flows in through the inflow opening, in particular air, serves for creating the guide flow that defines and delimits the maximum outflow angle.

Here, the at least one inflow opening determines a flow direction for fluid that is flowing in via the inflow opening, in particular for air that is flowing in via the inflow opening, which is inclined radially inwards towards the nozzle longitudinal axis.

Accordingly, the inflow opening defines an inflow channel that guides fluid from the outside through the burner seal and lets it flow out along a radially inwardly inclined flow direction.

What is thus provided within the context of the proposed solution—for example in addition to a radially outwardly positioned and possibly axially protruding air guiding element of the nozzle main body—is a guide flow generation device at the nozzle and/or the burner seal of the combustion chamber assembly group, which is configured for creating at least one guide flow of air or of another fluid, in particular in order to maintain the fuel-air mixture discharged at the nozzle exit opening within a predefined outflow angle as well as possibly within an outflow cone that is thus defined. The guide flow that is created by the guide flow generation device then determines the outflow angle at which a flow of the air that is discharged at the nozzle exit opening and in particular of a fuel-air mixture that is discharged at the nozzle exit opening can extend radially outwards so as to be maximally inclined with respect to the nozzle longitudinal axis. The guide flow thus determines an outflow direction that is maximally inclined with respect to the nozzle longitudinal axis, and that is followed by an outermost edge of the flow of air discharged from the nozzle exit opening and of a fuel-air mixture discharged at the nozzle exit opening.

Thus, by means of a guide flow that is generated in a targeted manner, certain outflow characteristics are predefined in particular for the discharged fuel-air mixture, and an expansion of a intermixed flow of the fuel-air mixture—beyond the maximally admissible outflow angle as determined by the guide flow—is limited. This particularly includes the generation of an (air) guide flow by means of the guide flow generation device, which defines an outflow cone inside of which the fuel-air mixture discharged at the nozzle exit opening remains. Accordingly, a radially outwardly positioned air guiding element can continue to serve the purpose of creating the fuel-air mixture, in particular serve the purpose of guiding air discharged from an air guiding channel radially inwards as well as of supporting guidance of the resulting fuel-air mixture radially outwards. However, an additional flow guiding element at the burner seal can be omitted or at least shortened since the significant (further) guidance of the fuel-air mixture radially outwards and the limitation of an outflow angle is taken over by the guide flow that is created in a targeted manner by means of the guide flow generation device.

Generally, in addition to the inner (first) air guiding channel, the nozzle of the combustion chamber assembly group can have one or multiple further (second and/or third) air guiding channels that are positioned radially further outside. In that case, an end of such an air guiding channel, at which the air is discharged from the respective air guiding channel in the direction of the nozzle exit opening, is positioned radially further inside as compared to the air guiding element, and the air flow generation direction is always provided in addition to the inner air guiding channel and possible further air guiding channels.

In one embodiment variant, in addition to the inner (first) air guiding channel, the nozzle has at least one further (second) air guiding channel that is positioned radially further outwards, with at least one air guiding element being provided at its end.

Generally, the guide flow generation device for creating a radially outermost guide flow, which may possibly surround a resulting fuel-air mixture in the manner of an annulus, can be configured and provided for defining and delimiting a maximum outflow angle for the radially outwardly oriented outflow direction of the fuel-air mixture with respect to the nozzle longitudinal axis.

In one embodiment variant, at least one component of the guide flow generation device, in particular a component that is participating in creating the guide flow, is provided radially further inside or radially further outside with respect to the nozzle longitudinal axis as compared to the at least one radially outwardly positioned air guiding element. Here, a component that is provided radially further inside may for example be provided at the nozzle and in particular at the nozzle main body, while a component that is provided radially further outside is provided at the burner seal.

In a further development, the inflow opening is additionally configured for guiding fluid flowing in via the inflow opening, in particular air flowing in via the inflow opening, in the direction towards a radially outer shell surface of the nozzle. For example, the inflow opening is configured for guiding air that is flowing in via the inflow opening onto a radially outer shell surface of the radially outwardly positioned air guiding element of the nozzle main body. At this radially outer shell surface of the radially outwardly positioned air guiding element, the flow from the inflow opening can be guided along the burner seal and/or can be guided radially outwards to define a part of the guide flow.

In an embodiment variant based hereon, an additional guiding channel is formed between a flow guiding element of the burner seal and a section of the radially outer shell surface of the nozzle, and the inflow opening is configured for guiding fluid that is flowing in through the inflow opening, in particular air that is flowing in via the inflow opening, into the additional guiding channel. In this way, during operation of the engine, air is guided via the inflow opening into an additional guiding channel that is formed between a flow guiding element of the burner seal and a section of the radially outer shell surface, and at the end of which the guide flow or at least a portion of this guide flow is discharged at the predetermined outflow angle. Accordingly, the additional guiding channel can for example extend axially with respect to the nozzle longitudinal axis, and, at the end of the nozzle main body, can lead to the generation of the guide flow that determines the outflow direction and in particular the outflow angle.

A flow guiding element of the burner seal that is provided for creating the additional guiding channel can extend axially with respect to the nozzle longitudinal axis at an end that is located in the area of the nozzle exit opening, i.e. without forming an end section that extends radially outwards and widens radially outwards, and via which the fuel-air mixture discharged at the nozzle exit opening would be guided. Rather, the guidance of the fuel-air mixture is realized by means of the guide flow that is discharged from the additional guiding channel, so that a flow guiding element of the burner seal has to axially protrude only with a comparatively small length in the direction of the combustion chamber. In this way, temperature-related wear to the flow guiding element as a result of the high temperatures that are present inside the combustion chamber can be strongly reduced or even avoided.

In an alternative embodiment variant, the burner seal has no flow guiding element in the area of the nozzle exit opening. Thus, the burner seal has no axially protruding projection which protrudes in direction of a combustion chamber of the engine if the combustion chamber assembly group is mounted according to the intended use, in particular has no axially protruding projection that axially protrudes beyond the air guiding element of the nozzle. In such a variant, the guidance of the fuel-air mixture is not limited by a flow guiding element at the side of the burner, but is mostly limited to a predetermined outflow angle by the guide flow that is created during operation of the engine by means of the guide flow generation device.

In one embodiment variant, at least one guiding element of the guide flow generation device can be provided at the nozzle for creating at least a portion of the guide flow, independently of whether a flow guiding element is or is not provided at the burner seal. Consequently, in this case the guiding element as a component of the guide flow generation device is formed at the nozzle and in particular as a part of the nozzle main body, for example in the area of the nozzle exit opening.

In an embodiment variant based hereon, the at least one guiding element is arranged at a distance to the radially outwardly positioned air guiding element, with an air guiding gap being formed. Thus, as compared to the air guiding element, the at least one guiding element is thus positioned radially further inside and forms the air guiding gap together with a section of the air guiding element. This air guiding gap can in particular be formed in such a manner that it is narrowed in the kind of a nozzle to generate a correspondingly accelerated air flow for the guide flow. Here, the nozzle is formed and configured for guiding air that flows out from at least one air guiding channel to the air guiding gap that is formed between the at least one guiding element and the air guiding element, with a portion of the guide flow defining and delimiting the outflow angle being subsequently discharged therefrom.

Thus, in particular an air jet for the guide flow can be created by means of the at least one guiding element. This air jet is oriented radially outwards at the outflow angle, and radially delimits the air that is discharged at the nozzle exit opening as well as the fuel-air mixture that is discharged at the nozzle exit opening. Here, in one embodiment variant, the air jet is discharged from the air guiding gap formed by means of the at least one guiding element with a flow velocity at the nozzle exit opening that is higher—possibly higher by at least 3%, 5%, 10%, 15% or 20%—than a flow velocity of the air that is discharged at the nozzle exit opening and of the fuel-air mixture that is discharged at the nozzle exit opening. Thus, the at least one guiding element is configured for creating an air jet with a correspondingly increased flow velocity for the guide flow. Here, a portion of the air that is available at the nozzle exit opening and that comes from the at least one air guiding channel of the nozzle is correspondingly deflected and accelerated by means of the at least one guiding element to thus define the guide flow which defines the maximum outflow angle.

What is proposed according to a second aspect is a combustion chamber assembly group, with a nozzle and a burner seal in which the nozzle has a nozzle main body that comprises the nozzle exit opening and extends along a nozzle longitudinal axis, and that further comprises at least the following:

a nozzle for a combustion chamber of an engine for providing a fuel-air mixture at a nozzle exit opening of the nozzle, and a burner seal having a passage opening inside of which the nozzle is positioned, wherein the nozzle has a nozzle main body that comprises the nozzle exit opening and that extends along a nozzle longitudinal axis, and the nozzle main body further comprises at least the following:

at least one inner air guiding channel for conveying air to the nozzle exit opening, extending along the nozzle longitudinal axis, at least one fuel guiding channel for conveying fuel to the nozzle exit opening, positioned radially further outwards with respect to the nozzle longitudinal axis as compared to the inner air guiding channel, and at least one air guiding element for guiding the air that is discharged at the nozzle exit opening and the fuel-air mixture that is discharged at the nozzle exit opening into a radially outwardly oriented outflow direction, positioned radially outwards with respect to the nozzle longitudinal axis as compared to the inner air guiding channel and the fuel guiding channel, wherein in addition to the at least one air guiding element a guide flow generation device is provided, which is configured for creating at least one guide flow which radially bounds the air that is discharged at the nozzle exit opening and the fuel-air mixture that is discharged at the nozzle exit opening, and defines and delimits a maximum outflow angle for the outflow direction with respect to the nozzle longitudinal axis at which the air discharged at the nozzle exit opening and the fuel-air mixture discharged at the nozzle exit opening can flow radially outwards, wherein the guide flow generation device is at least partially provided at the nozzle and/or at the burner seal, and wherein at the burner seal, for creating at least a portion of the guide flow, at least one inflow opening of the guide flow generation device is provided, wherein the at least one inflow opening is configured for guiding the air that flows in through the inflow opening in the direction towards a radially outer shell surface of the nozzle.

What is further provided as a part of the proposed solution is an engine, in particular a gas turbine engine with at least one combustion chamber assembly group.

SHORT DESCRIPTION OF THE DRAWINGS

The attached Figures illustrate possible embodiment variants of the proposed solution by way of example.

DETAILED DESCRIPTION

Figure 3A:
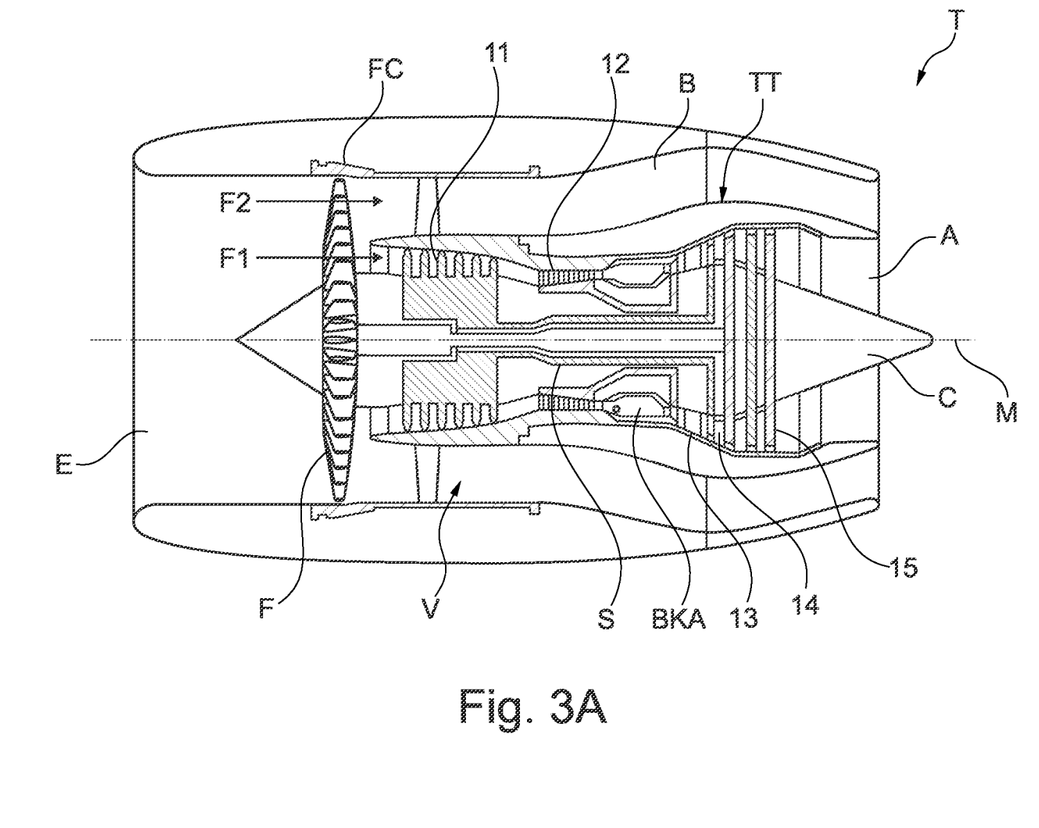
FIG. 3A shows an engine in which the embodiment variants of FIGS. 1 to 6 are used.

FIG. 3A schematically illustrates, in a sectional view, a (turbofan) engine T in which the individual engine components are arranged in succession along a rotational axis or central axis M and the engine T is embodied as a turbofan engine. By means of a fan F, air is suctioned in along an entry direction at an inlet or an intake E of the engine T. This fan F, which is arranged inside a fan housing FC, is driven by means of a rotor shaft S that is set into rotation by a turbine TT of the engine T. Here, the turbine TT connects to a compressor V, which for example has a low-pressure compressor 11 and a high-pressure compressor 12, and where necessary also a medium-pressure compressor. The fan F supplies air to the compressor V in a primary air flow F1, on the one hand, and, on the other, to a secondary flow channel or bypass channel B in a secondary air flow F2 for creating a thrust. Here, the bypass channel B extends about a core engine that comprises the compressor V and the turbine TT, and also comprises a primary flow channel for the air that is supplied to the core engine by the fan F.

The air that is conveyed by means of the compressor V into the primary flow channel is transported into the combustion chamber section BKA of the core engine where the driving power for driving the turbine TT is generated. For this purpose, the turbine TT has a high-pressure turbine 13, a medium-pressure turbine 14, and a low-pressure turbine 15. The turbine TT drives the rotor shaft S and thus the fan F by means of the energy that is released during combustion in order to generate the necessary thrust by means of the air that is conveyed into the bypass channel B. The air from the bypass channel B as well as the exhaust gases from the primary flow channel of the core engine are discharged by means of an outlet A at the end of the engine T. Here, the outlet A usually has a thrust nozzle with a centrally arranged outlet cone C.

Figure 3B:
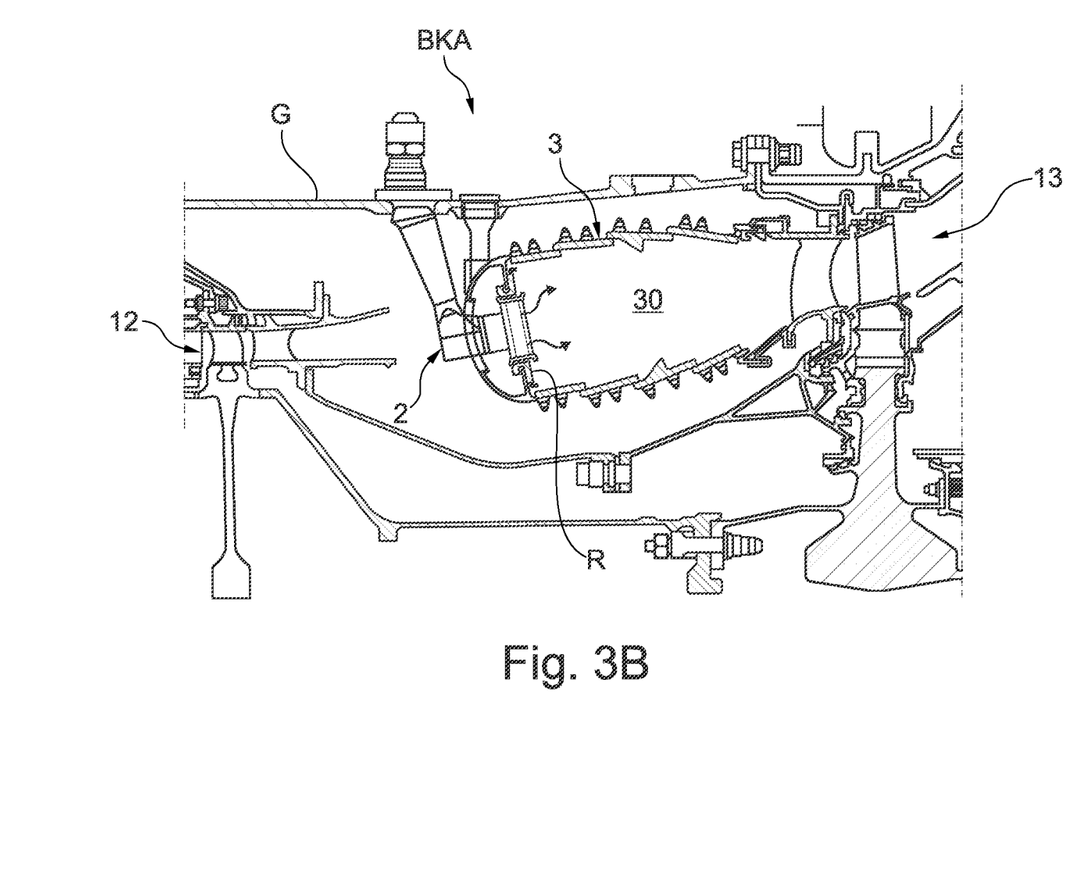
FIG. 3B shows, in sections and on an enlarged scale, the combustion chamber of the engine of FIG. 3A.

FIG. 3B shows a longitudinal section through the combustion chamber section BKA of the engine T. Here, in particular an (annular) combustion chamber 3 of the engine T can be seen. A nozzle assembly group is provided for injecting fuel or an air-fuel-mixture into a combustion space 30 of the combustion chamber 3. It comprises a combustion chamber ring R along which multiple (fuel/injection) nozzles 2 are arranged along a circular line about the central axis M. Here, the nozzle exit openings of the respective nozzles 2 that are positioned inside the combustion chamber 3 are provided at the combustion chamber ring R. Here, each nozzle 2 comprises a flange by means of which a nozzle 2 is screwed to an outer housing G of the combustion chamber 3.

Figure 3C:
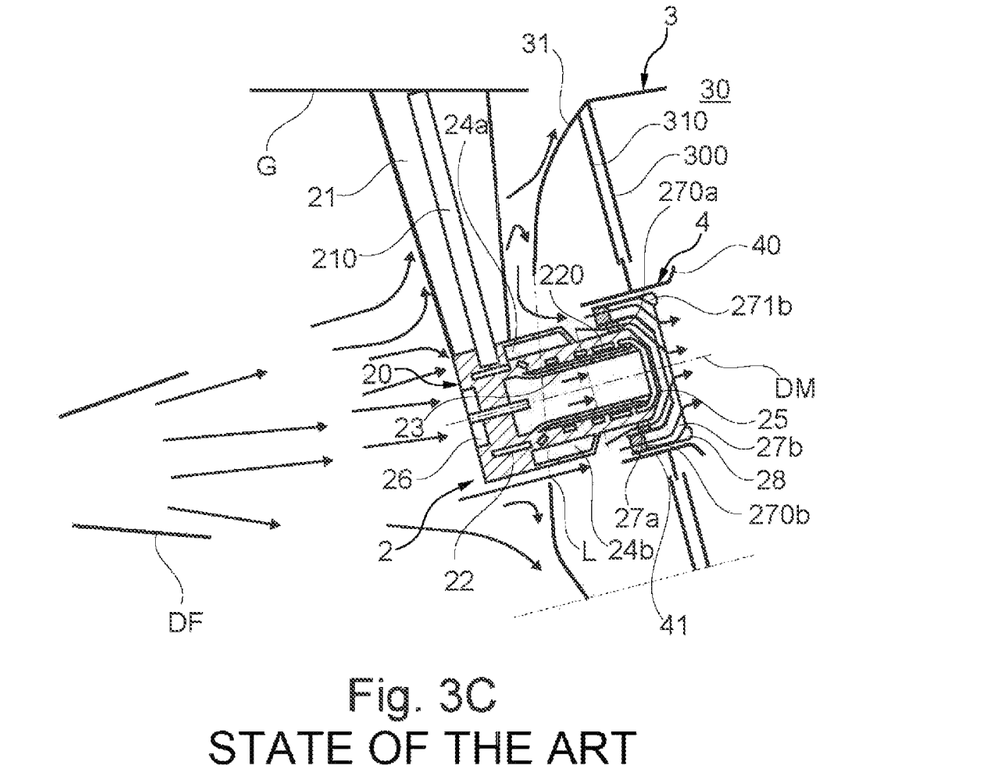
FIG. 3C shows, in a cross-sectional view, the basic structure of a nozzle according to the state of the art and the surrounding components of the engine in the installed state of the nozzle.

FIG. 3C now shows a cross-sectional view of the basic structure of a nozzle 2 as well as the surrounding components of the engine T in the installed state of the nozzle 2. Here, the nozzle 2 is part of a combustion chamber assembly group of the engine T. The nozzle 2 is located downstream of a diffuser DF and during mounting is inserted through an access hole L through a combustion chamber head 31, through a heat shield 300 and a head plate 310 of the combustion chamber 3 up to the combustion space 30 of the combustion chamber 3, so that a nozzle exit opening formed at a nozzle main body 20 reaches all the way into the combustion space 30. Here, the nozzle 2 is positioned at the combustion chamber 3 by means of a bearing section 41 of a burner seal 4 and is supported in a passage opening of the bearing section 41. The burner seal 4 is a part of the combustion chamber assembly group that comprises the nozzle 2.

The nozzle 2 further comprises a nozzle neck 21 which substantially extends radially with respect to the central axis M and inside of which a fuel supply 210 conveying fuel to the nozzle main body 20 is accommodated. Further formed at the nozzle main body 20 are a fuel chamber 22, fuel passages 220, heat shields 23 as well as air chambers 24a, 24b for insulation. In addition, the nozzle main body 20 forms a (first) inner air guiding channel 26 extending centrally along a nozzle longitudinal axis DM in an axial direction x and, positioned radially further outside with respect to the same, a (second and third) outer air guiding channel 27a and 27b. These air guiding channels 26, 27a and 27b extend in the direction of the nozzle exit opening of the nozzle 2.

Further, at least one fuel guiding channel 26 is formed at the nozzle main body 20. This fuel guiding channel 25 is located between the first inner air channel 26 and the second outer air guiding channel 27a. The end of the fuel guiding channel 25, by means of which fuel flows out in the direction of the air from the first inner air guiding channel 26 during operation of the nozzle 2, is located—with respect to the nozzle longitudinal axis DM and in the direction of the nozzle exit opening—in front of the end of the second air channel 27a from which air from the second, outer air guiding channel 27a flows out in the direction of a mixture of air from the first, inner air guiding channel 26 and fuel from the fuel guiding channel 25.

Figure 3D:
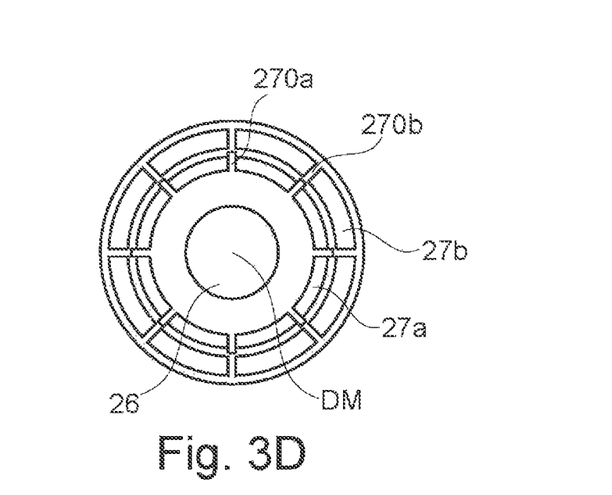
FIG. 3D shows a back view of a nozzle exit opening, also showing swirling elements that are provided in radially outwardly positioned air guiding channels of the nozzle.

Swirling elements 270a, 270b for swirling the air supplied through the air guiding channels 27a and 27b are provided in the outer air guiding channels 27a and 27b. Further, the nozzle main body 20 also comprises an outer, radially inwardly oriented air guiding element 271b at the end of the third outer air guiding channel 27b. In the nozzle 2, which may e.g. be a pressure-assisted injection nozzle, the ends of the second and third radially outwardly located air guiding channels 27a and 27b follow—with respect to the nozzle longitudinal axis DM and in the direction of the nozzle exit opening—the end of the fuel guiding channel 25 from which fuel is supplied to the air from the first inner centrally extending air guiding channel 26 during operation of the engine T, according to FIG. 3C. Air that is swirled by means of the swirling elements 270a, 270b is transported to the nozzle exit opening from these second and third air guiding channels 27a and 27b. As shown in the back view of FIG. 3D with a view of the nozzle exit opening along the nozzle longitudinal axis DM, these swirling elements 270a, 270b are arranged inside the respective air guiding channel 27a, 27b in a circumferentially distributed manner.

A sealing element 28 is also provided at the nozzle main body 20 at its circumference for sealing the nozzle 2 towards the combustion space 30. This sealing element 28 forms a counter-piece to a burner seal 4. This burner seal 4 is floatingly mounted between the heat shield 300 and the head plate 310 to compensate for radial and axial movements between the nozzle 2 and the combustion chamber 3 and to ensure reliable sealing in different operational states.

The burner seal 4 has a flow guiding element 40 towards the combustion space 30. In connection with the third outer air guiding channel 27b at the nozzle 2, this flow guiding element 40 ensures a desired flow guidance of the fuel-air mixture that results from the nozzle 2, more precisely the swirled air from the air guiding channels 26, 27a and 27b, as well as the fuel guiding channel 25.

In a combustion chamber assembly group according to FIG. 3C as it is known from the state of the art, the flow guiding element 40 of the burner seal 4, which axially protrudes to beyond the nozzle exit opening and projects into the combustion space 30, takes over the guidance of the fuel-air mixture radially outwards at a limited outflow angle. Although, in addition to a guidance of the air flowing out of the third air guiding channel 27b radially inwards, also a guidance of the fuel-air mixture in a radially outwardly oriented (outflow) direction is supported by means of the air guiding element 271b formed at the nozzle main body 20 and provided at the end of the radially outermost third air guiding channel 27b, a targeted influencing of the outflow characteristics of the fuel-air mixture with respect to a defined radial limitation of an outflow cone is usually not associated herewith. This function is taken over by the flow guiding element 40 of the [burner seal] 4.

However, since the flow guiding element 40 of the burner seal 4 has to project into the combustion space 30 for this purpose, the burner seal 4 is subject to high thermal loads during operation of the engine T. Even by using cooling air openings which are provided at the burner seal 4, usually in the area of the bearing section 41, and via which cooling air is guided to the flow guiding element 40, it is often impossible to avoid that the flow guiding element 40 is damaged as a result of the temperature, and that the burner seal 4 has to be replaced as a part of the maintenance of the engine T.

This problem is remedied by means of the proposed combustion chamber assembly group. Here, a guide flow generation device is provided in addition to at least one air guiding element, such as the air guiding element 271b of the nozzle 2 shown in FIG. 3C. This guide flow generation device is configured for creating at least one guide flow that radially borders the air discharged at the nozzle exit opening and the fuel-air mixture discharged at the nozzle exit opening, and predefines and delimits a maximum outflow angle α for the outflow direction with respect to the nozzle longitudinal axis DM—typically without an end section of a flow guiding element 40 of the burner seal 4 being oriented in the direction of the outflow direction—at which the air discharged at the nozzle exit opening and the fuel-air mixture discharged at the nozzle exit opening can flow radially outwards.

Figure 1:
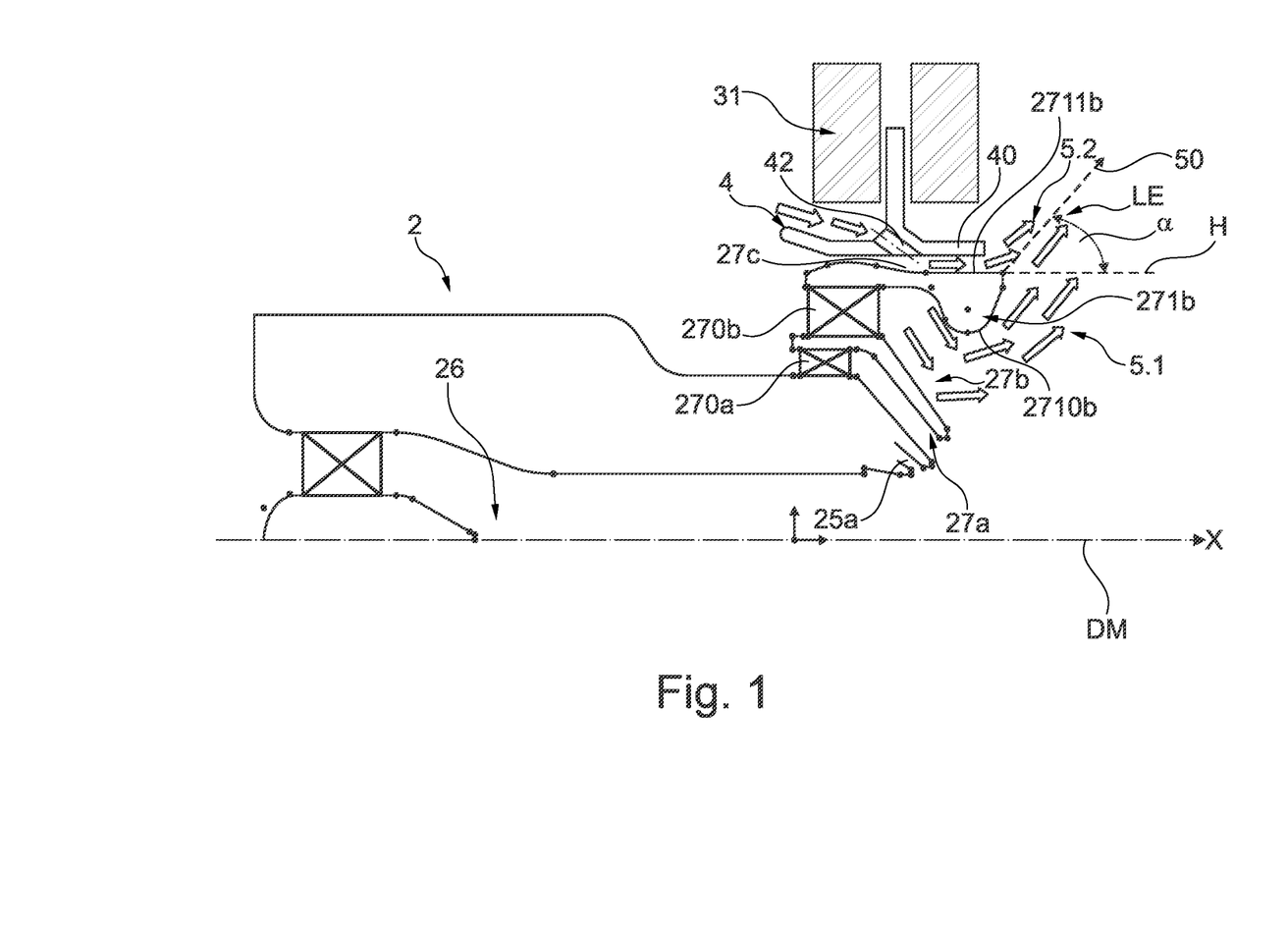
FIG. 1 shows, in sections, a first embodiment variant of a proposed combustion chamber assembly group, with a guide flow generation device that forms an additional guiding channel between a shortened flow guiding element of a burner seal and a radially outer shell surface of a nozzle for creating a guide flow that delimits the radial outflow angle of a fuel-air mixture at a nozzle exit opening.
Figure 2:
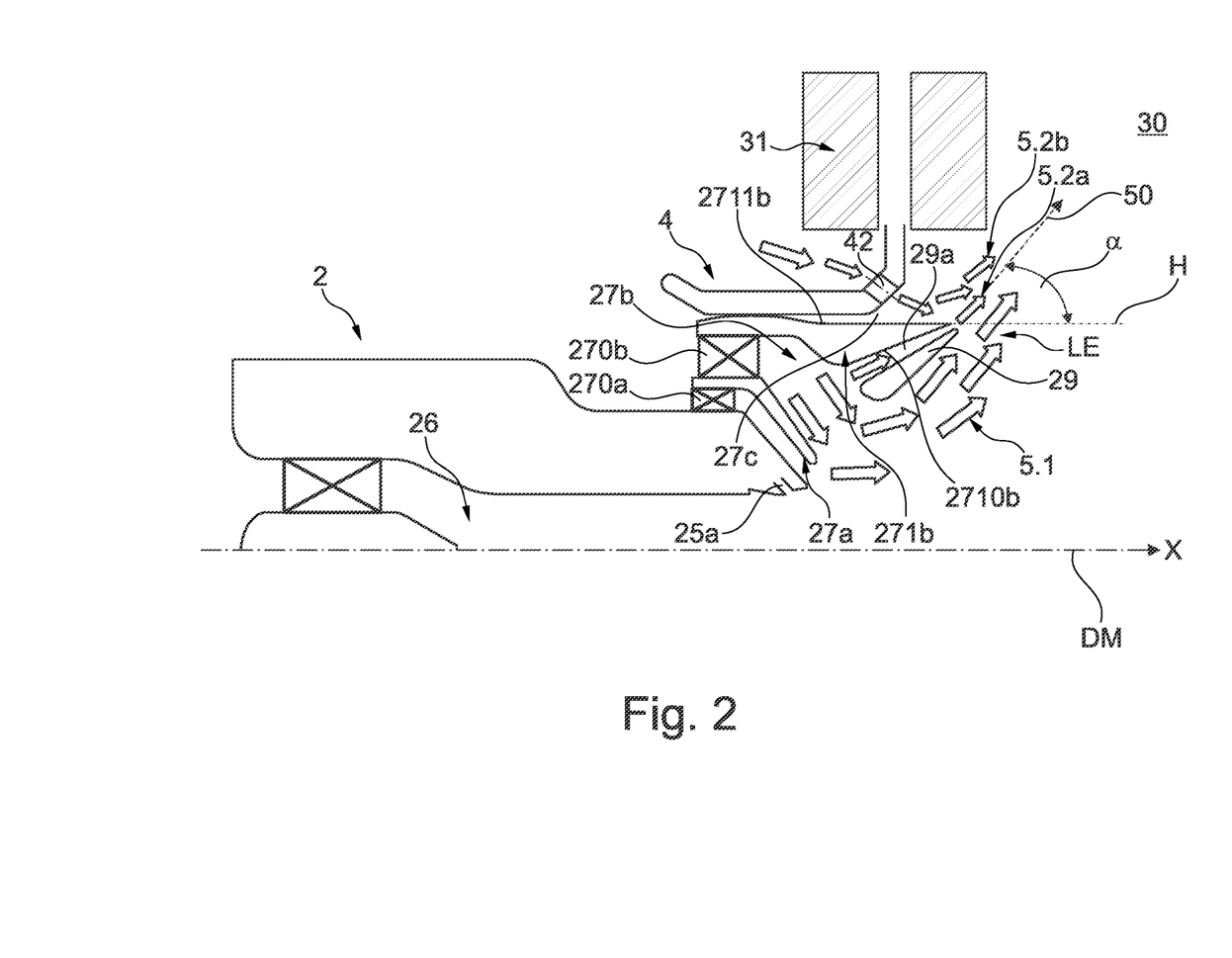
FIG. 2 shows, in a view that corresponds to FIG. 1, a further embodiment variant of a proposed combustion chamber assembly group, with a burner seal without a flow guiding element and a nozzle-side guiding element of a guide flow generation device for creating a radially outwardly oriented air jet for the guide flow.

In the embodiment variants of FIGS. 1 and 2, a guide flow generation device LE is provided, which is configured for creating at least one guide flow 5.2, 5.2a/5.2b of air that defines and delimits a maximum outflow angle α for an outflow direction 50 with respect to the nozzle longitudinal axis DM. At that, the guide flow generation device LE is at least partially provided at the nozzle 2 and/or at the burner seal 4, respectively. Thus, a flow cone inside of which an intermixed flow 5.1 of the fuel-air mixture remains is defined by means of the guide flow 5.2, 5.2a/5.2b that can thus be created, without a flow guiding element 40 projecting into the combustion space 30 and/or protruding axially beyond the nozzle-side air guiding element 271b having to be provided at the burner seal 4. Here, a radial delimitation and guidance of the intermixed flow 5.1 is predefined mostly or exclusively by the guide flow 5.2, 5.2a/5.2b that is created by means of the guide flow generation device LE.

FIG. 1 shows an embodiment variant of the combustion chamber assembly group in sections and on a scale that is enlarged as compared to the rendering of FIG. 3C. The guide flow generation device LE of this embodiment variant comprises at least one inflow opening 42 at the burner seal 4 as well as an additional guiding channel 27c that is formed between a shortened flow guiding element 40 of the burner seal 4 and a radially outer shell surface 2711b of the air guiding element 271b. The additional guiding channel 27c can for example be formed so as to extend circumferentially about the nozzle longitudinal axis DM in a ring-shaped or ring-segment-shaped manner.

Via an inflow opening 42 or multiple inflow openings 42, air from the outside is transported through the burner seal 4 to the axially outer shell surface 2711b of the air guiding element 271b and into the additional guiding channel 27c. Here, a flow channel that is defined by the inflow opening 42 in the burner seal 4 extends so as to be inclined radially inwards with respect to the nozzle longitudinal axis DM, so that air flowing in through the inflow opening(s) 42 is guided to the radially outer shell surface 2711b of the nozzle 2 along a radially inwardly inclined flow direction. At the radially outer shell surface 2711b of the nozzle 2, the inflowing air is deflected and is guided at the end of the additional guiding channel 27c along a radially outwardly oriented outflow direction 50. The air flow flowing out of the additional guiding channel 27c forms a guide flow 5.2. This guide flow 5.2 flows along the outflow direction 50 at a defined outflow angle α (with α being in the range of 1 to 75°, in particular in the range of 15° to 55° or in the range of 32° to 47°) so as to be inclined radially outwards with respect to the nozzle longitudinal axis DM, and thus delimits the possible expansion of the intermixed flow 5.1 that is discharged from the nozzle exit opening in the radial direction.

Thus, by means of the guide flow 5.2 that flows out with a high velocity along the outflow direction 50 at the outflow angle α, an air flow that is discharged from the nozzle exit opening and the fuel-air mixture of the intermixed flow 5.1 that is discharged at the nozzle exit opening is radially delimited, and in particular a maximally possible outflow angle α is predefined and delimited for the intermixed flow 5.1. For reasons of clarity, FIG. 1 shows the outflow angle α with respect to a reference line H. This reference line H extends in parallel to the nozzle longitudinal axis DM through the axially outermost point of the outer shell surface 2711b of the nozzle 2, and thus through an outflow edge of the guide flow 5.2 that is defined at the nozzle 2.

By means of an inner contour 2710b of the air guiding element 271b, air that flows out at the end of the third air guiding channel 27b from the third air guiding channel 27b is deflected radially inwards to achieve an intermixing of the air with the injected fuel. By means of the inner contour 2710b of the air guiding element 271b, which is curved inwards in a convex manner in the cross-sectional rendering, it is also achieved that air discharged at the nozzle exit opening and the fuel-air mixture discharged at the nozzle exit opening is guided radially outwards. However, a targeted control of the maximally possible outflow angle α and a limitation of this outflow angle α are not achieved by means of the air guiding element 271b. What is provided for this purpose is the guide flow 5.1 that is generated by means of the guide flow generation device LE.

Due to the guide flow 5.1 that can be generated, the flow guiding element 40 of the [burner seal] 4 can be considerably shortened in the embodiment variant of FIG. 1 as compared to the combustion chamber assembly group according to FIG. 3C as it is known from the state of the art, and it in particular does not protrude axially beyond the air guiding element 271b. Thus, the flow guiding element 40 is subjected to considerably lower thermal loads during operation of the engine T. Also, since the flow guiding element 40 has a flow guiding function only with regards to the additional guiding channel 27c which extends axially and substantially in parallel to the nozzle longitudinal axis DM, but the flow guiding element 40 is not configured for guiding the intermixed flow 5.1 downstream of the nozzle exit opening, the flow guiding element 40 of the embodiment variant of FIG. 1 accordingly has no radially outwardly oriented and widening end section.

In the embodiment variant of FIG. 2, the burner seal 4 is formed entirely without any flow guiding element 40 that projects along the axial direction x. However, here too an inflow opening 42 or multiple inflow openings 42, which are distributed about the circumference of the burner seal 4 and serve for creating a portion of the guide flow 5.2a/5.2b by which the outflow angle α is determined, are a part of the guide flow generation device LE. Also in the embodiment variant of FIG. 2, air that flows via the inflow opening(s) 42 in the direction of the combustion space 30 is guided radially inwards, and namely towards the radially outer shell surface 2711b of the nozzle 2. Air flowing in via the inflow opening(s) 42 is deflected at this radially outer shell surface 2711b in the direction of the outflow direction 50, so that a portion of the guide flow 5.2a/5.2b is formed in this manner.

In addition to this component of the guide flow generation device LE that is positioned radially further outwards as compared to the air guiding element 271b, in the embodiment variant of FIG. 2 a nozzle-side and radially further inwardly positioned component of the guide flow generation device LE is provided in the form of at least one guiding element 29. This guiding element 29 is positioned at a distance to the air guiding element 271b, with an air guiding gap 29a being formed. Accordingly, the air guiding gap 29a is delimited radially outside by an inner shell surface of the air guiding element 271b that defines the inner contour 2710b, and radially inside by an outer shell surface of the guiding element 29. Here, the air guiding gap 29a is formed so as to become narrower along the nozzle longitudinal axis DM with respect to the axial direction x in a nozzle-like or tapering manner, being oriented in the outflow direction 50 with its end that is located in the axial direction x. Here, the air guiding gap 29a is dimensioned and in particular tapers off in such a manner that, by means of the air guiding gap 29a, an air jet is generated that has a higher flow velocity in the direction of the outflow direction 50 than the air that flows out at the nozzle exit opening and than the fuel-air mixture that is discharged at the nozzle exit opening. The air jet that is created by means of the air guiding gap 29a radially bounds the intermixed flow 5.1, extending at the outflow angle α to the nozzle longitudinal axis DM, and delimits the expansion of the intermixed flow 5.1 in the radial direction as a part of the guide flow 5.2a/5.2b.

In the present case, a guide flow 5.2a/5.2b formed of partial flows 5.2a and 5.2b from the air guiding gap 29a and the additional guiding channel 27c takes over the function of a flow guiding element 40 of the burner seal 4 according to FIG. 3C, but does so without a rigid structural component for guiding the intermixed flow 5.1 axially projecting to beyond the air guiding element 271b having to be provided for this purpose.

Incidentally, in the embodiment variant of FIG. 2, it is not absolutely necessary to generate an (air) guide flow 5.2a/5.2b via the at least one inflow opening 42 provided at the burner seal 4 as well as via a nozzle-side guiding element 29 and the air guiding gap 29a that is thus formed. In one variant of a guide flow generation device LE that is based on the embodiment variant of FIG. 2 only one of the two measures can be provided. Accordingly, a guiding element 29 that creates an air jet, in particular a guiding element 29 that extends circumferentially about the nozzle longitudinal axis DM and is positioned radially inside with respect to the air guiding element 271b can be provided for creating a guide flow 5.2a without additionally providing an inflow opening 42 at the burner seal 4.

It is to be understood that the proposed solution is not limited to the above-described embodiment examples, and that various modifications and improvements can be carried out without departing from the described concepts. Any of the features can be used either separately or in combination with any of the other features as long as they do not exclude each other, and the disclosure extends to all combinations and sub-combinations of one or multiple features described herein, and includes the same.

PARTS LIST 11 low-pressure compressor
12 high-pressure compressor
13 high-pressure turbine
14 medium-pressure turbine
15 low-pressure turbine
2 nozzle
20 nozzle main body
21 nozzle neck
210 fuel supply line
22 fuel chamber
220 fuel passage
23 heat shield
24a, 24b air chamber
25 fuel guiding channel
26 first air guiding channel
270a, 270b swirling element
2710b inner contour
2711b outer shell surface
271b air guiding element
27a second air guiding channel
27b third air guiding channel
27c additional guiding channel
28 sealing element
29 guiding element
29a air guiding gap
3 combustion chamber
30 combustion space
300 heat shield
31 combustion chamber head
310 heat plate
4 burner seal
40 flow guiding element
41 bearing section
42 inflow opening
5.1 mixture flow 5.2, 5.2a, 5.2b guide flow
50 outflow direction
A outlet
B bypass channel
BKA combustion chamber section
C outlet cone
D wall thickness
DF diffusor
DM nozzle longitudinal axis
E inlet/intake
F fan
F1, F2 fluid flow
FC fan housing
G outer housing
H reference line
L access hole
LE guide flow generation device
M central axis/rotational axis
R combustion chamber ring
S rotor shaft
T (turbofan) engine
TT turbine
V compressor
α outflow angle

The invention claimed is:

1. A combustion chamber assembly group, comprising:
   a nozzle for a combustion chamber of an engine for providing a fuel-air mixture at a nozzle exit opening of the nozzle, and
   a burner seal having a passage opening inside of which the nozzle is positioned,
   wherein the nozzle has a nozzle main body that comprises the nozzle exit opening and that extends along a nozzle longitudinal axis, and the nozzle main body further comprises at least the following:
     an inner air guiding channel for conveying air to the nozzle exit opening, extending along the nozzle longitudinal axis,
     a fuel guiding channel for conveying fuel to the nozzle exit opening, positioned radially further outwards with respect to the nozzle longitudinal axis as compared to the inner air guiding channel, and
     an air guiding element for guiding the air that is discharged at the nozzle exit opening and the fuel-air mixture that is discharged at the nozzle exit opening into a radially outwardly oriented outflow direction, positioned radially outwards with respect to the nozzle longitudinal axis as compared to the inner air guiding channel and the fuel guiding channel,
     in addition to the air guiding element, a guide flow generation device configured for creating a guide flow which radially bounds the air that is discharged at the nozzle exit opening and the fuel-air mixture that is discharged at the nozzle exit opening, and which defines and delimits a maximum outflow angle for the outflow direction with respect to the nozzle longitudinal axis at which the air discharged at the nozzle exit opening and the fuel-air mixture discharged at the nozzle exit opening flows radially outwards,
   wherein the guide flow generation device is at least partially provided at the nozzle and/or at the burner seal, and
   wherein at least one inflow opening of the guide flow generation device is provided at the burner seal for creating at least a portion of the guide flow, wherein the at least one inflow opening defines a flow direction for the air that flows in via the inflow opening which is inclined radially inwards with respect to the nozzle longitudinal axis.

2. The combustion chamber assembly group according to claim 1, wherein, in addition to the inner air guiding channel, the nozzle has at least one further, radially further outwardly positioned air guiding channel, with the air guiding element being provided at an end of the radially further outwardly positioned air guiding channel.

3. The combustion chamber assembly group according to claim 2, wherein, in addition to the inner air guiding channel, the nozzle has at least two further air guiding channels that are arranged at a radial distance to each other, with ends of the at least two further air guiding channels being provided radially further inside at the nozzle main body as compared to the air guiding element, and the guide flow generation device is additionally provided at the inner air guiding channel and the at least two further air guiding channels.

4. The combustion chamber assembly group according to claim 1, wherein at least one component of the guide flow generation device is provided radially further inside or radially further outside with respect to the nozzle longitudinal axis as compared to the radially outwardly positioned air guiding element.

5. The combustion chamber assembly group according to claim 1, wherein the at least one inflow opening is configured for guiding air that flows in via the inflow opening in a direction towards a radially outer shell surface of the nozzle.

6. The combustion chamber assembly group according to claim 1, wherein an additional guiding channel is formed between a flow guiding element of the burner seal and a section of the radially outer shell surface of the nozzle, and the inflow opening is configured for guiding air that flows in via the inflow opening into the additional guiding channel.

7. The combustion chamber assembly group according to claim 1, wherein the burner seal does not have a flow guiding element in an area of the nozzle exit opening.

8. The combustion chamber assembly group according to claim 1, wherein at least one guiding element of the guide flow generation device is provided at the nozzle for creating at least a portion of the guide flow.

9. The combustion chamber assembly group according to claim 8, wherein the at least one guiding element is arranged at a distance to the radially outwardly positioned air guiding element, with an air guiding gap being formed.

10. The combustion chamber assembly group according to claim 8, wherein an air jet for the guide flow is generated by the at least one guiding element.

11. An engine with the combustion chamber assembly group according to claim 1.

12. A combustion chamber assembly group, with
   a nozzle for a combustion chamber of an engine for providing a fuel-air mixture at a nozzle exit opening of the nozzle, and
   a burner seal having a passage opening inside of which the nozzle is positioned wherein the nozzle has a nozzle main body that comprises the nozzle exit opening and that extends along a nozzle longitudinal axis, and the nozzle main body further comprises at least the following:
     an inner air guiding channel for conveying air to the nozzle exit opening, extending along the nozzle longitudinal axis,
     a fuel guiding channel for conveying fuel to the nozzle exit opening, positioned radially further outwards with respect to the nozzle longitudinal axis as compared to the inner air guiding channel, and an air guiding element for guiding the air that is discharged at the nozzle exit opening and the fuel-air mixture that is discharged at the nozzle exit opening into a radially outwardly oriented outflow direction, positioned radially outwards with respect to the nozzle longitudinal axis as compared to the inner air guiding channel and the fuel guiding channel, in addition to the air guiding element, a guide flow generation device configured for creating a guide flow which radially bounds the air that is discharged at the nozzle exit opening and the fuel-air mixture that is discharged at the nozzle exit opening, and which defines and delimits a maximum outflow angle for the outflow direction with respect to the nozzle longitudinal axis at which the air discharged at the nozzle exit opening and the fuel-air mixture discharged at the nozzle exit opening flows radially outwards, wherein the guide flow generation device is at least partially provided at the nozzle and/or at the burner seal, and wherein at least one inflow opening of the guide flow generation device is provided at the burner seal for creating at least a portion of the guide flow, wherein the at least one inflow opening is configured for guiding the air that flows in through the inflow opening in a direction towards a radially outer shell surface of the nozzle.

\* \* \* \* \*